Figure 11:
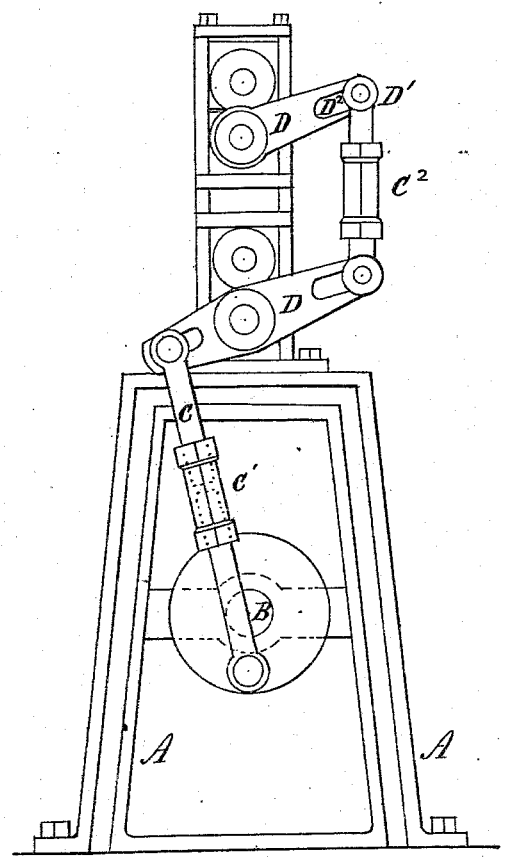
Figure 12:
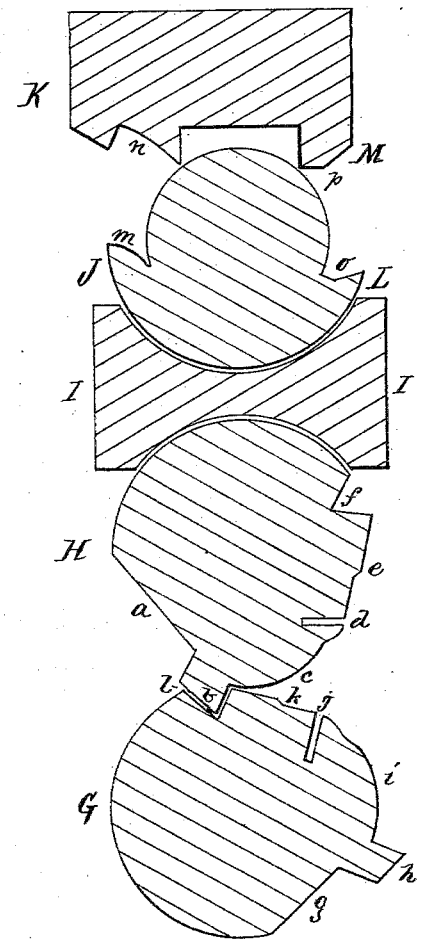
Figure 13:
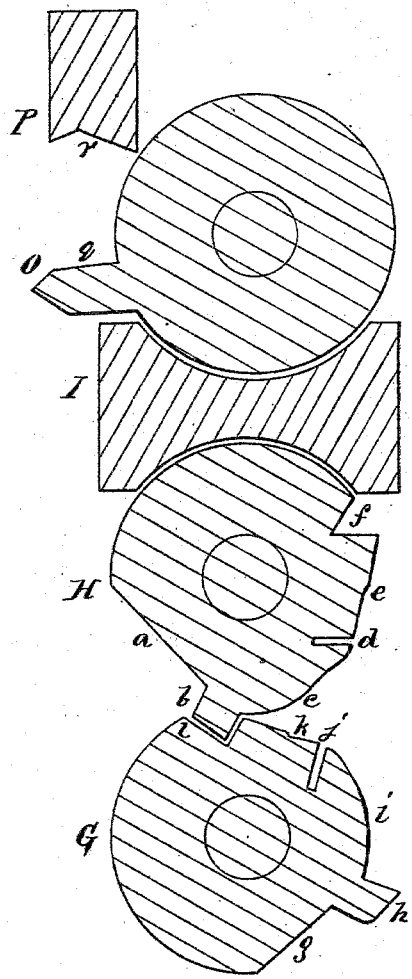
Figure 14:
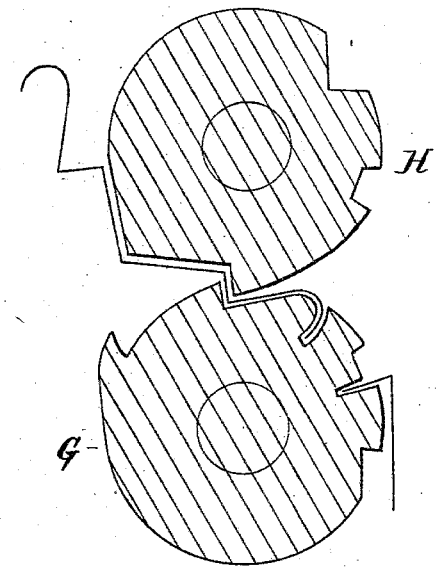
Figure 15:
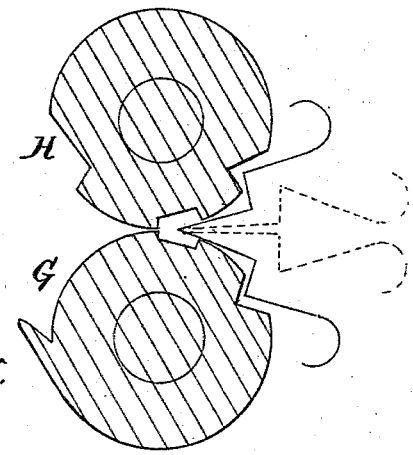

(No Model.)
5 Sheets—Sheet 1.
G. HAYES.
MACHINE FOR THE MANUFACTURE OF SKYLIGHT BARS, WINDOW SASH BARS, AND MOLDINGS.
No. 289,096. Patented Nov. 27, 1883.
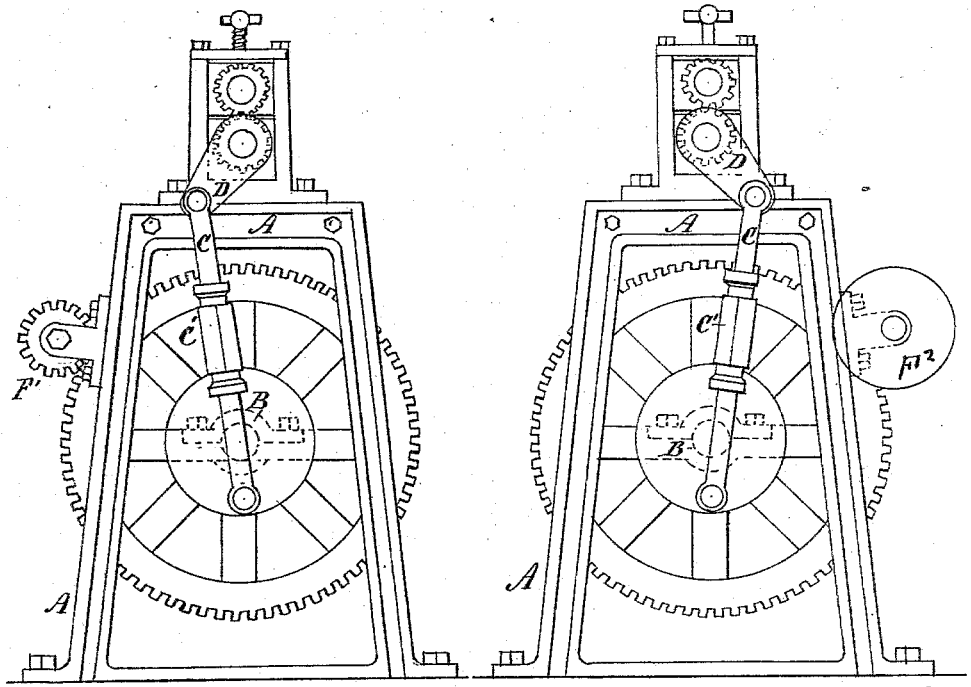
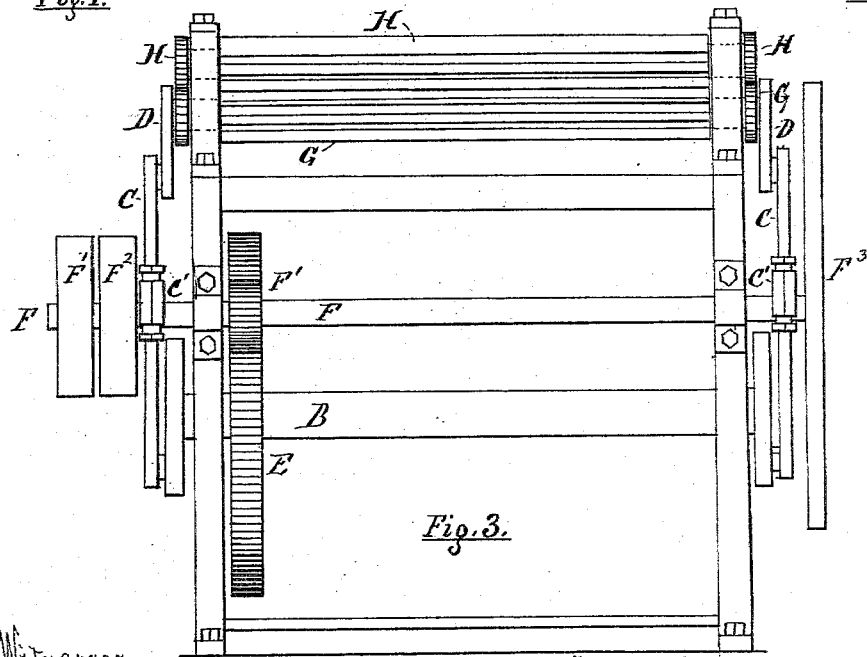
Witnesses.
Jacob Koch
Charles Hayes
Inventor.
George Hayes (No Model.) 5 Sheets—Sheet 2.
G. HAYES.
MACHINE FOR THE MANUFACTURE OF SKYLIGHT BARS, WINDOW SASH BARS, AND MOLDINGS.
No. 289,096. Patented Nov. 27, 1883.
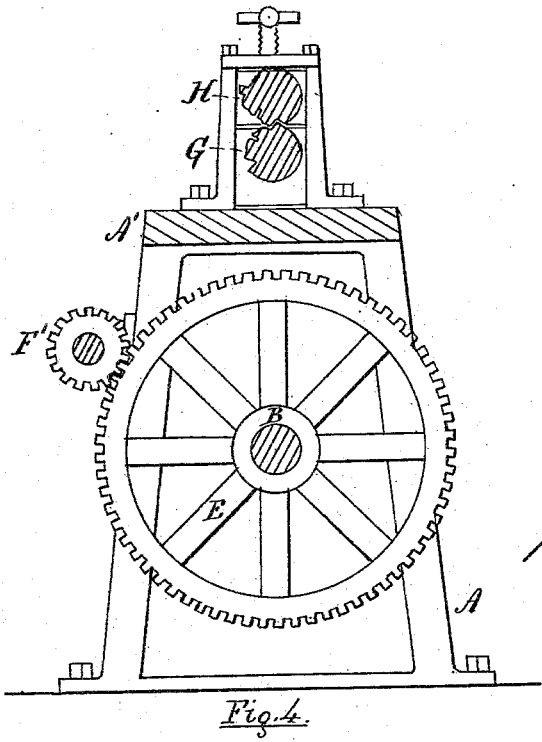
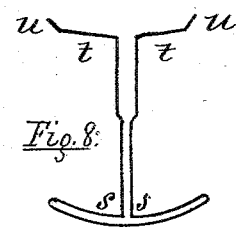
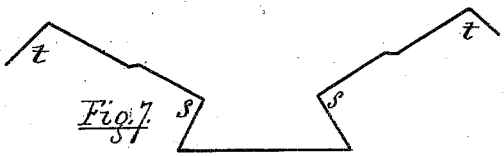
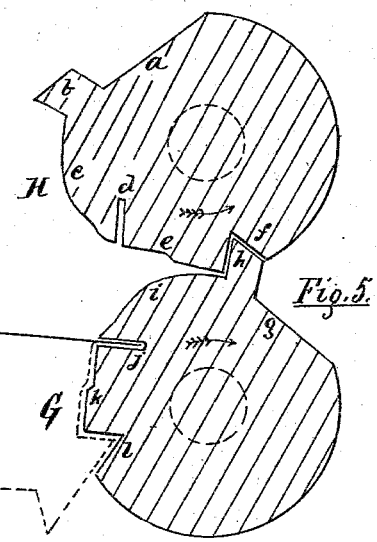
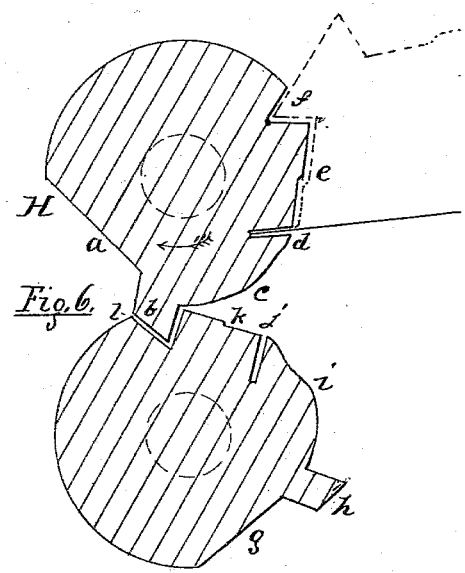
Witnesses:
Jacob Koch
Charles Hayes
Inventor:
George Hayes

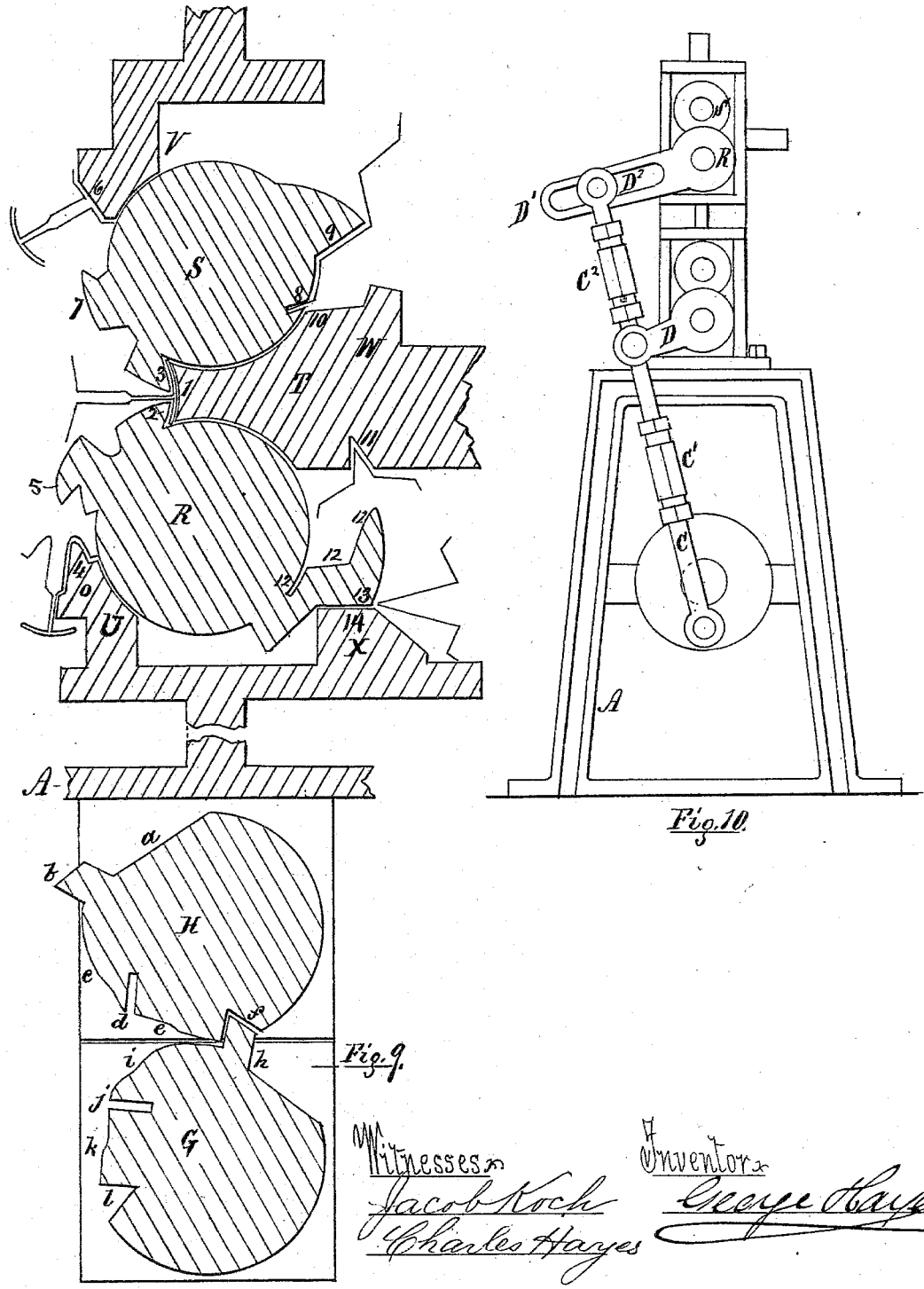

(No Model.) 5 Sheets—Sheet 4.
G. HAYES.
MACHINE FOR THE MANUFACTURE OF SKYLIGHT BARS, WINDOW SASH BARS, AND MOLDINGS.

No. 289,096. Patented Nov. 27, 1883.

Witnesses
Jacob Koch
Charles Harjes

Inventor
George Hayes (No Model.)  5 Sheets—Sheet 5.

G. HAYES.
MACHINE FOR THE MANUFACTURE OF SKYLIGHT BARS, WINDOW SASH BARS, AND MOLDINGS.

No. 289,096.  Patented Nov. 27, 1883.

Witnesses:
Jacob Koch
Charles Hayes

Inventor:
George Hayes

UNITED STATES PATENT OFFICE.

GEORGE HAYES, OF NEW YORK, N. Y.

MACHINE FOR THE MANUFACTURE OF SKYLIGHT-BARS, WINDOW-SASH BARS, AND MOLDINGS.

SPECIFICATION forming part of Letters Patent No. 289,096, dated November 27, 1883.

Application filed November 9, 1882. (No model.)

*To all whom it may concern:*

Be it known that I, GEORGE HAYES, a resident of the city, county, and State of New York, have invented a new and useful Machine for the Manufacture of Skylight Bars or Rafters and Window-Sash Bars and Moldings, of which the following is a specification.

The machine is especially constructed for the purpose of bending up into shape (partially or wholly) sheet metal to constitute the rafters of a glazed roof, the bars of a skylight, or the bars of glazed sashes, to be used in stores, dwellings, show-cases, &c.

The nature of the invention consists in a machine, the operative mechanism of which is—

First. A crank-shaft provided with belt-pulleys, two main die shafts or rollers connected with each other by gearing, and one or both of the die-shafts connected with the crank-shaft by adjustable pitmen. The die-shafts have their faces indented, or otherwise shaped, to exercise the function of bending, squeezing, or otherwise forming the sheet of metal into the required shape. The dies act upon the sheet of metal by their coacting points, and not by coacting faces. The dies are so formed that two sizes of bar may be made in the same dies, one sheet being fed from one side and the other from the other side of the machine; but they may be formed to mold one size only, if desired.

Second. It consists in the combination of supplemental or finishing die-shafts, one or more, around, in, or upon which are dies in number, according to the several operations required to be made upon the bar or rafter after having undergone the passage through the main dies for the purpose of finishing the same to their completion, and also to form and completely finish a cap from another piece of sheet metal, which cap is to be used upon the bar or rafter when the same is in its proper place in a structure, and the glazing finished, the cap serving to cover the joints and prevent leakage. These operations upon the bar and the formation of the cap may all be performed upon two die-shafts, and these are used in conjunction and combination with four stationary dies when the full amount of forms are required, but when less are required then the use of some of the stationary dies may be dispensed with.

Third. It consists in the combination of jointed and adjustable pitmen with the supplemental die-shafts and the crank-shaft, the said pitmen being constructed in two lengths or sections, so that by turning one or more sleeves thereon, their length may be made greater or less, as required, to regulate the throw of the dies. The pitmen are connected to the shaft or shafts by slotted cranks toward the outer end thereof, the pitmen being attached in such manner that their distance from the die-shaft may be increased or diminished, as may be necessary.

In the accompanying drawings, Figure 1 is an elevation of one side or end of the machine. Fig. 2 is an elevation of the opposite end of the machine, being the end to which power is applied. Fig. 3 is a front elevation of the machine. Fig. 4 is a vertical section, looking toward the end to which power is applied. Fig. 5 is a cross-section of the two die-shafts in position for receiving the sheet metal for one size bar or rafter—the sheet shown as entering. Dotted lines show shape of the sheet after the operation. Fig. 6 is a cross-section of the same two die-shafts, giving their position after the metal has passed through from position of Fig. 5. In this position the dies are ready to receive a sheet from the rear side, giving it in passing through another size bar or rafter, the sheet shown as entering, its shape after the operation shown by dotted lines. Fig. 7 shows in section the sheet of metal as formed by the two dies of Figs. 5 and 6. These dies I denominate "main dies." The sheet is afterward, by supplemental or finishing dies, brought to the shape about as shown in Fig. 8. Fig. 8 shows in section the finished bar or rafter, without rivets, core-plates, or caps. Variations in shape require only simple variations in the form of die-faces. By these die-shafts many other bars may be made of differing shapes, by having the die-faces formed to suit, and combined in this machine in similar manner. Fig. 9 shows a cross-section of a set of supplemental die-shafts, each having located at points around their faces dies arranged to act in conjunction and combination with stationary dies, (also shown,) and each combination of dies adapted to perform a distinct operation upon the bar or rafter in finishing; also to form a bar-cap. Fig. 10 shows a side or end elevation of the machine with adjustable and jointed pitmen; also, the slotted cranks extending out from the die-shafts, which are also shown in connection, illustrating one manner of connecting and operating main-dies and finishing-dies when in combination. Fig. 11 shows a side or end elevation of the machine, illustrating another manner of arranging the adjustable pitmen, and slotted cranks to operate the main and supplemental die-shafts. Figs. 12, 13, 14, and 15 are sectional views of other forms of die-shafts to be used in combination with stationary dies, and without, and such may be used in the same machine by removing those described herein and substituting these forms, which I consider equivalents therefor. By this means other forms of bars or rafters may be made in the same machine than those described herein.

The drawings represent the machine with die-shafts arranged to oscillate and not revolve entirely; but it may be readily understood how they may be adjusted to revolve when requisite. There are five sheets of drawings, marked, respectively, I, II, III, IV, V.

A represents the end standards or sides of the machine.

A' is the bed of the machine.

B is the crank-shaft, having attached or connected at each end thereto an adjustable pitman, C, rendered adjustable as to length by its being made in two parts and provided with a sleeve, C', threaded thereon. Each pitman is connected at its upper end to a crank, D, extended out from the lower die-shaft, so that by this means motion, either revolving or oscillating, may be readily communicated from the crank-shaft B to the dies above. The crank-shaft is shown as provided with cog-wheel E, geared to an auxiliary shaft, F, by a cog-wheel, F', thereon.

At $F^2$ are shown pulley-wheels, and at $F^3$ is shown a hand-wheel, not always necessary, but sometimes useful.

The machine may be operated without an auxiliary shaft, the crank-shaft answering; but for gaining power or speed as many auxiliary or counter shafts may be applied as requisite.

G represents the lower main die-shaft, and H the upper die-shaft. These shafts are geared at each end, so as to operate together upon a sheet of metal placed thereto for the purpose of being bent into shape as shown in Fig. 7. The die-faces are shown as formed in Figs. 5 and 6 for this purpose. In this construction the upper die has a flat, $a$, projection $b$, curve $c$, groove $d$, curve $e$, and groove $f$, and the lower die has a flat, $g$, projection $h$, curve $i$, groove $j$, curve $k$, and groove $l$. The manner in which they are fitted together is shown in Figs. 5 and 6, in which the dies are enlarged to about half their full size as compared with Figs. 1, 2, 3, and 4. The grooves $d$ and $j$ are holding-grooves. Into one of these the sheet is inserted and held in its passage through the dies—one size sheet to one side and another size to the other side of the machine. In its passage the sheet is bent over the edge of the holding-groove at an angle, and so held thereby, the portion thus held becoming an element of the finished bar. The flanges $t$ are thus formed by the holding-groove into shape, as in Figs. 7 and 8. The parts marked $s$ in said figures are formed by grooves $f$ or $l$ of the die-faces, according as to which side of the machine the sheet enters. By these dies, as shown, one half of the bar or rafter of Fig. 7 is formed, and by turning the sheet the other half is formed in like manner.

The pitmen shown in Figs. 1, 2, and 3 are adjusted to give oscillating motion to the die-shafts, so as to run the sheet in and out, and to this manner of operating these dies of Fig. 5 and 6 are adapted. The pitmen may be adjusted to revolve die-shafts, if desirable.

In Fig. 9 two supplemental or finishing dies, R and S, are shown, having their faces provided with projecting die-faces adapted to act in conjunction and combination with stationary dies or die-holders T U V W X to effect a result in finishing the bar and also to form a cap thereto. These faces are marked with numerals. 1, 2, and 3 act in combination to bring the bar together after it has left the main dies into the shape shown therein. By these also the gutters of the bar are formed. 4 and 5 give the upper flanges of the ridge-bars the shape shown therein, and which shape is necessary to enable them to enter properly into a hipped skylight, and finishing those bars. 6 and 7 give the upper flanges of the side bars the shape shown therein, finishing those bars. 8 is a holding-groove, into which is inserted the edge of a piece of metal intended for a cap; and as 9 and 10 are brought together, 8, 9, and 10 bring the metal into the shape shown therein. This sheet so bent is then placed upon or into dies 11 and 12, and by them, when brought together, closed, and formed into the shape shown therein. The apex or acute angle thereof intended to form a ridge is then closed by being placed into 13 and 14, they acting in conjunction for that purpose. All these operations are effected through the oscillating motion of the die-shafts. The dies 1, 2, and 3, also 13 and 14, are shown closed. All the others are open. The reverse motion of the die-shafts will open these and close the others. Many forms of dies being modifications of these shown may be used in this machine, and skylight or sash bars and metal rafters produced in endless variety. The sheet of metal is placed in the dies breadthwise, and several or all these dies may be operated at the same time and fed by boys, and perfectly so after less than an hour's experience.

In Fig. 10 is shown adjustable pitman C, provided with an extension, $C^2$, jointed thereto, and also provided with a sleeve, C', and also shown the slotted crank D' connected to die-shafts R. The slot $D^2$ affords means of shortening or lengthening the distance of the pitman $C^2$ from the shaft R.

In Fig. 11 is shown a variation in the arrangement of adjustable pitmen and cranks. Various other forms or sizes of bars than those described herein may be made upon similar shafts, as illustrated by Figs. 12, 13, 14, and 15, and on the one side of the head or stationary die-holder, the shafts formed to make one-size bar or shape from one side, while another size or shape may be made on the other side, together at the same time or alternately.

Any number of die-shafts may be applied to the same machine, operating from the same crank-shaft, they being connected at both sides by geared wheels, or separate rods and eccentrics, or by adjustable pitmen.

For increase of power, if necessary, auxiliary or counter shafts may be used and with or without a fly-wheel.

What I claim as new, and desire to secure by Letters Patent of the United States, is—

1. The machine A, having crank-shaft B, adjustable pitman C, crank D, and die-shafts G and H, all constructed, arranged, and combined substantially as shown and described.

2. The machine A, having crank-shaft B, adjustable pitmen C C, cranks D D, and die-shafts G and H, all constructed, arranged, and combined substantially as shown and described.

3. The upper die-shaft, H, having its face provided with flat $a$, projection $b$, curve $c$, groove or indentation $d$, curve $e$, and groove $f$, combined thereon, substantially as shown, in combination with the lower die-shaft, G, having its face provided with flat $g$, projection $h$, curve $i$, groove or indentation $j$, curve $k$, and groove $l$, combined thereon, substantially as shown, both shafts being arranged to operate together, substantially as and for the purpose set forth.

4. The combination, with die-shafts G and H, of the crank D, crank-shaft B, pitman C, and adjustable sleeve C', whereby the die-shafts may be caused to revolve or oscillate, substantially as described.

5. In combination with three or more die-shafts, as shown in Figs. 10 and 11, the adjustable and jointed pitmen C C², with cranks D D', and crank-shaft B, all arranged to operate substantially as shown and described.

6. The combination of dies 2 and 3 of die-shafts R and S with die 1 of die-holder T, substantially as shown and described.

7. The combination of die 5 of die-shaft R with die 4 of die-holder U, substantially as shown and described.

8. The combination of die 7 of die-shaft S with die 6 of die-holder V, substantially as shown and described.

9. The combination of die-shafts R and S with die-holders T, U, and V, provided with coacting dies, movable and stationary, substantially as shown and described.

10. The combination of slot 8 and die 9 on oscillating shaft S with die 10 on stationary die-holder W, substantially as shown and described.

11. The combination of die 12 of die-shaft R with die 11 of die-holder T, substantially as shown and described.

12. The combination of die 13 of die-shaft R with die 14 of die-holder X, substantially as shown and described.

13. The combination of die-shafts R and S with die-holder T, provided with coacting dies, movable and stationary, substantially as shown and described.

GEORGE HAYES.

Witnesses:
 JNO. L. FORBES,
 RICHARD H. REILLE.